US012231615B2

(12) United States Patent
Xiao et al.

(10) Patent No.: US 12,231,615 B2
(45) Date of Patent: Feb. 18, 2025

(54) DISPLAY SYSTEM WITH MACHINE LEARNING (ML) BASED STEREOSCOPIC VIEW SYNTHESIS OVER A WIDE FIELD OF VIEW

(71) Applicant: Meta Platforms Technologies, LLC, Menlo Park, CA (US)

(72) Inventors: Lei Xiao, Redmond, WA (US); Salah Eddine Nouri, Zurich (CH); Joel Hegland, Snohomish, WA (US); Douglas Robert Lanman, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/980,342

(22) Filed: Nov. 3, 2022

(65) Prior Publication Data

US 2023/0239456 A1 Jul. 27, 2023

Related U.S. Application Data

(60) Provisional application No. 63/303,371, filed on Jan. 26, 2022.

(51) Int. Cl.
*H04N 13/344* (2018.01)
*G02B 30/22* (2020.01)
(Continued)

(52) U.S. Cl.
CPC ........... *H04N 13/344* (2018.05); *G02B 30/22* (2020.01); *G06F 1/163* (2013.01); *H04N 13/156* (2018.05);
(Continued)

(58) Field of Classification Search
CPC .. H04N 13/344; H04N 13/156; H04N 13/257; H04N 2013/0081; H04N 13/122;
(Continued)

(56) References Cited

U.S. PATENT DOCUMENTS 10,866,425 B1 * 12/2020 Price .................... G02B 27/017
11,120,266 B2 * 9/2021 Rabinovich ......... G06F 3/04842
(Continued)

FOREIGN PATENT DOCUMENTS

WO 2021126424 A1 6/2021
WO 2022003740 A1 1/2022

OTHER PUBLICATIONS

Broxton M., et al., "Immersive Light Field Video with a Layered Mesh Representation," ACM Transactions on Graphics, Article 86, Jul. 2020, vol. 39 (4), 15 pages.
(Continued)

*Primary Examiner* — Susan E. Hodges
(74) *Attorney, Agent, or Firm* — Mannava & Kang, P.C.

(57) ABSTRACT

According to examples, a head-mounted display (HMD) headset may include at least two exterior-facing color cameras mounted on the front face of the HMD and in the same visual plane as the user's eyes. The at least two exterior-facing color cameras may collect images for stereo view synthesis. The HMD may include a processor, and a memory storing instructions, which when executed by the processor, cause the processor to perform stereo view synthesis with a machine-learning (ML) based technique including at least one of depth estimation, imaging sharpening, forward splatting, disocclusion filtering, or fusion.

19 Claims, 11 Drawing Sheets

(51) Int. Cl.
*G06F 1/16* (2006.01)
*G06G 1/16* (2006.01)
*H04N 13/156* (2018.01)
*H04N 13/257* (2018.01)
*H04N 13/00* (2018.01)

(52) U.S. Cl.
CPC ... *H04N 13/257* (2018.05); *H04N 2013/0081* (2013.01)

(58) Field of Classification Search
CPC .... H04N 13/128; H04N 13/239; G02B 30/22; G02B 2027/0134; G02B 27/0172; G02B 2027/0138; G02B 2027/014; G06F 1/163; G06F 1/1686; G06F 3/011; G06F 3/013; G06N 3/0464; G06N 3/084
USPC .......................................................... 348/53
See application file for complete search history.

(56) References Cited

U.S. PATENT DOCUMENTS

| | | | |
|---|---|---|---|
| 11,200,745 B2* | 12/2021 | Johnson | G06T 7/0002 |
| 2017/0337737 A1* | 11/2017 | Edwards | F16M 13/04 |
| 2018/0060683 A1 | 3/2018 | Kontsevich et al. | |
| 2018/0302614 A1* | 10/2018 | Toksvig | H04N 23/698 |
| 2019/0094981 A1* | 3/2019 | Bradski | H04N 21/414 |
| 2019/0122373 A1* | 4/2019 | Natroshvili | G06F 18/25 |
| 2023/0324684 A1* | 10/2023 | Fortin-Deschenes | G06F 3/012 345/8 |

OTHER PUBLICATIONS

Chapiro A., et al., "Optimizing Stereo-to-Multiview Conversion for Autostereoscopic Displays," Computer Graphics forum, 2014, vol. 33, No. 2, 10 pages.
Chaurasia G., et al., "Passthrough+: Real-Time Stereoscopic view Synthesis for Mobile Mixed Reality," Proceedings of the ACM on Computer Graphics and Interactive Techniques, 2020, vol. 3, No. 1, pp. 1-17.
Didyk P., et al., "Joint View Expansion and Filtering for Automultiscopic 3D Displays," ACM Transactions on Graphics, Nov. 1, 2013, vol. 32 (6), 9 Pages.
Flynn J., et al., "DeepView: View Synthesis with Learned Gradient Descent," Proceedings of the IEEE Conference on Computer Vision and Pattern Recognition (CVPR), 2019, 2367-2376.
Gao C., et al., "Dynamic View Synthesis from Dynamic Monocular Video," Proceedings of the IEEE/CVF International Conference on Computer Vision (ICCV), Oct. 10-17, 2021, 10 pages.
Gortler S. J., et al., "The Lumigraph," Proceedings of the 23rd Annual Conference on Computer Graphics and Interactive techniques, 1996, pp. 43-54.
Jain A., et al., "Putting NeRF on a Diet: Semantically Consistent few-Shot View Synthesis," Proceedings of the IEEE/CVF International Conference on Computer Vision (ICCV), 2021, pp. 5885-5894.
Kai Z., et al., "NERF++: Analyzing and improving neural radiance fields," arXiv preprint arXiv:2010.07492, 2020, 9 pages.
Kalantari N.K., et al., "Learning-Based View Synthesis for Light Field Cameras," ACM Transactions on Graphics (Proc. SIGGRAPH), Nov. 2016, vol. 35 (6), Article 193, 193:1-193:10, 10 pages.
Kopf J., et al., "One Shot 3D Photography," ACM Transactions on Graphics (Proc. SIGGRAPH), 2020, vol. 39, No. 4, pp. 76:1-76:13.
Krajancich B., et al., "Optimizing Depth Perception in Virtual and Augmented Reality Through Gaze-Contingent Stereo Rendering," ACM Transactions on Graphics (TOG), Dec. 2020, vol. 39, No. 6, pp. 1-10.
Levoy M., et al., "Light Field Rendering," Proceedings of the 23rd Annual Conference on Computer Graphics and Interactive Techniques, 1996, pp. 31-42.
Lingjie L., et al., "Neural Sparse Voxel Fields," arXiv preprint arXiv:2007.11571, 2020, 22 pages.
Lipson L., et al., "Raft-Stereo: Multilevel Recurrent Field Transforms for Stereo Matching," arXiv preprint arXiv:2109.07547, 2021, 10pages.
Liu G., et al., "Image Inpainting for Irregular Holes Using Partial Convolutions," Proceedings of the European conference on computer vision (ECCV), 2018, 16 pages.
Meta Store., Quest2: Immersive All-In-One VR Headset Get Beat Saber Included, 2021, 11 pages, Retrieved from the Internet: URL: https://www.oculus.com/quest-2/.
Microsoft., "Azure Kinect DK," 2021, 3 pages, Retrieved from the Internet: URL: https://azure.microsoft.com/en-us/services/kinect-dk/.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis," European Conference on Computer Vision (ECCV), Aug. 3, 2020, 25 pages.
Oculus., "PC-Powered VR Gaming," Rift S Features, 2021, 3 pages, Retrieved from the Internet: URL: https://www.oculus.com/rift-s/features/.
Pumarola A., et al., "D-Nerf: Neural Radiance Fields for Dynamic Scenes," Proceedings of the IEEE/CVF Conference on Computer Vision and Pattern Recognition(CVPR), Jun. 20-25, 2021, 10 pages.
Reiser C., et al., "KiloNeRF: Speeding up Neural Radiance Fields with Thousands of Tiny MLPs." arXiv:2103.13744, Aug. 2, 2021, 11 pages.
Shih M-L., et al., "3D Photography using Context-Aware Layered Depth Inpainting," Computer Vision and Pattern Recognition (CVPR), 2020, pp. 8028-8038.
Simon N., et al., "Softmax Splatting for Video Frame Interpolation," In Proceedings of the IEEE/CVF Conference on Computer Vision and Pattern Recognition (CVPR), 2020, pp. 5437-5446.
Soundararajan R., at al., "Video Quality Assessment by Reduced Reference Spatio-Temporal Entropic Differencing," IEEE Transactions on Circuits and Systems for Video Technology, Aug. 22, 2012, vol. 23 (4), pp. 684-694.
Srinivasan P.P., et al., "Pushing the Boundaries of view Extrapolation with Multiplane Images," Proceedings of the IEEE/CVF Conference on Computer Vision and Pattern Recognition (CVPR), 2019, pp. 175-184.
Wang Z., et al., "Image Quality Assessment: from Error Visibility to Structural Similarity," IEEE Transactions on Image Processing, 2004, vol. 13, No. 4, 14 pages.
Xiao L., et al., "Deepfocus: Learned Image Synthesis for Computational Display," ACM Transactions on Graphics (TOG), 2018, vol. 37 No. 6, pp. 1-13.
Yu A., et al., "PixelNeRF: Neural Radiance Fields from One or few Images," Proceedings of the IEEE/CVF Conference on Computer Vision and Pattern Recognition, 2021, pp. 4578-4587.
Yu., A., et al., "Plenoctrees for real-time rendering of neural radiance fields," arXiv preprint arXiv:2103.14024, 2021, 18 pages.
Zhang Z., et al., "Light Field from Micro-Baseline Image Pair," Proceedings of the IEEE conference on computer vision and pattern recognition(CVPR), 2015, pp. 3800-3809.
Zhou T., et al., "Stereo Magnification: Learning view Synthesis using Multiplane Images," arXiv preprint arXiv:1805.09817, 2018, 12 pages.
International Search Report and Written Opinion for International Application No. PCT/US2023/011504, mailed Jul. 17, 2023, 16 pages.
Invitation to Pay Additional Fees for International Application No. PCT/US2023/011504, May 19, 2023, 11 pages.
International Preliminary Report on Patentability for International Application No. PCT/US2023/011504, mailed Aug. 8, 2024, 13 pages.

* cited by examiner

600B

600E

600F

DISPLAY SYSTEM WITH MACHINE LEARNING (ML) BASED STEREOSCOPIC VIEW SYNTHESIS OVER A WIDE FIELD OF VIEW

CROSS REFERENCE TO RELATED APPLICATIONS

This patent application claims the benefit of U.S. Provisional Patent Application Ser. No. 63/303,371 filed on Jan. 26, 2022. The disclosures of the above application are hereby incorporated by reference for all purposes.

TECHNICAL FIELD

This patent application relates generally to display systems, and more specifically, to display systems with machine learning (ML) based stereoscopic view synthesis over a wide field of view (FOV) in various artificial environments.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted device (HMD), such as a wearable headset, wearable eyewear, or eyeglasses. In some examples, the head-mounted device (HMD) may employ a first projector and a second projector to direct light associated with a first image and a second image, respectively, through one or more intermediary optical components at each respective lens, to generate "binocular" or "stereoscopic" vision for viewing by a user.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Some display systems, such as, VR-based head-mounted devices and/or eyewear devices, provide an immersive, stereoscopic visual experience. In such displays, however, this may come at the cost of blocking users from directly observing their physical environment. Accordingly, passthrough techniques may be provided to address this limitation by leveraging outward-facing cameras, which may be used to reconstruct the images that would otherwise be seen by the user without the headset. This may provide a real-time view synthesis challenge, since passthrough cameras cannot be physically co-located with the user's eyes.

Existing passthrough techniques may suffer from any number of drawbacks. For example, some passthrough techniques may result in distracting reconstruction artifacts, largely due to the lack of accurate depth information (especially for near-field and disoccluded objects), or may also exhibit limited image quality (e.g., being low resolution and monochromatic).

The systems and methods described herein may provide a learned passthrough technique to provide a more immersive experience of virtual worlds using rendered external imaging. Specifically, the systems and methods described herein may employ hardware/mechanical configurations, together with machine leaning (ML) based techniques, to improve image reconstruction quality. These ML-based techniques may help with: depth estimation, imaging sharpening, forward splatting, disocclusion filtering, and/or fusion. Accordingly, the systems and methods described herein may deliver high resolution image quality while meeting strict VR application requirements for real-time, perspective-correct stereoscopic view synthesis over a wide field of view.

Figure 1:
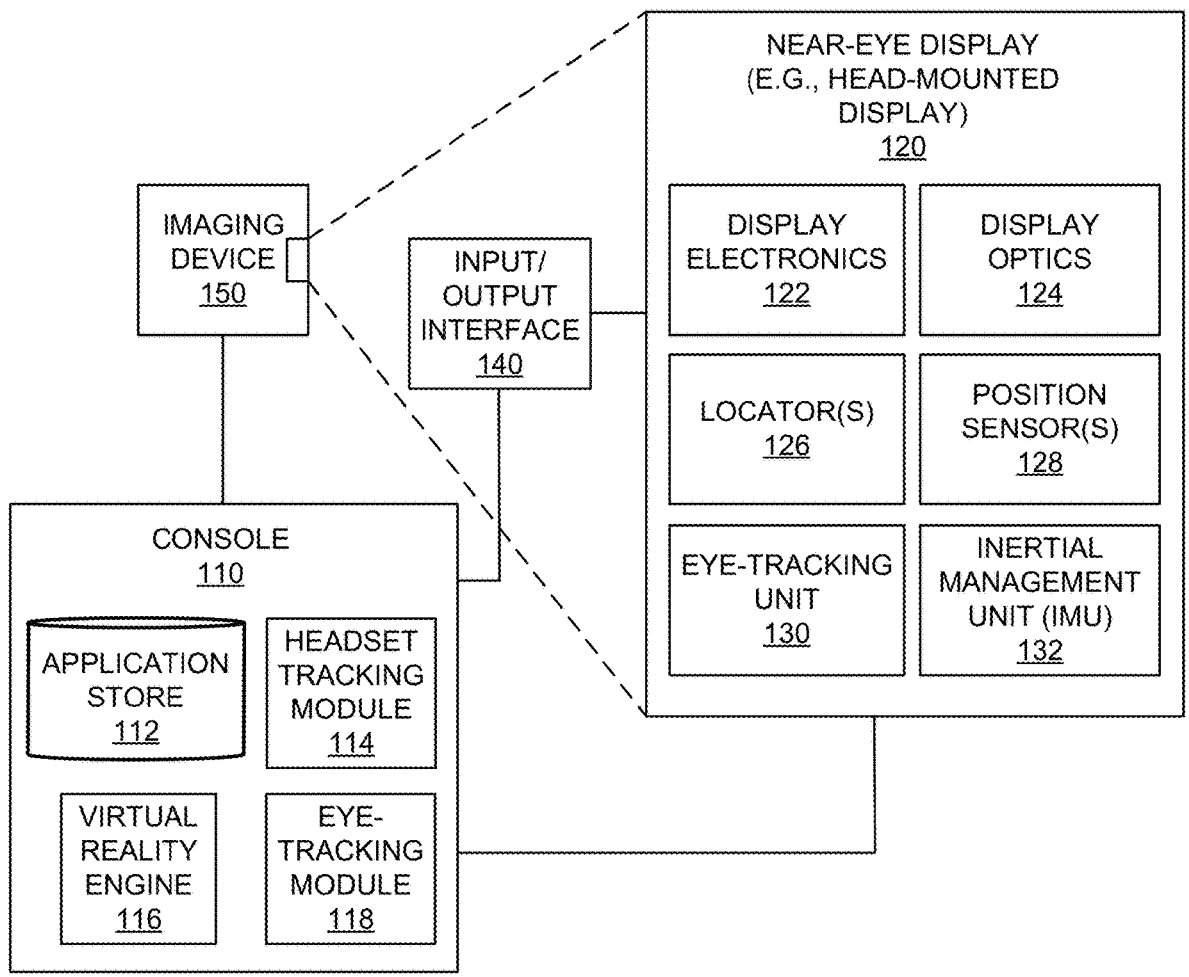
FIG. 1 illustrates a block diagram of an artificial reality system environment including a near-eye display, according to an example.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlayed digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optical console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
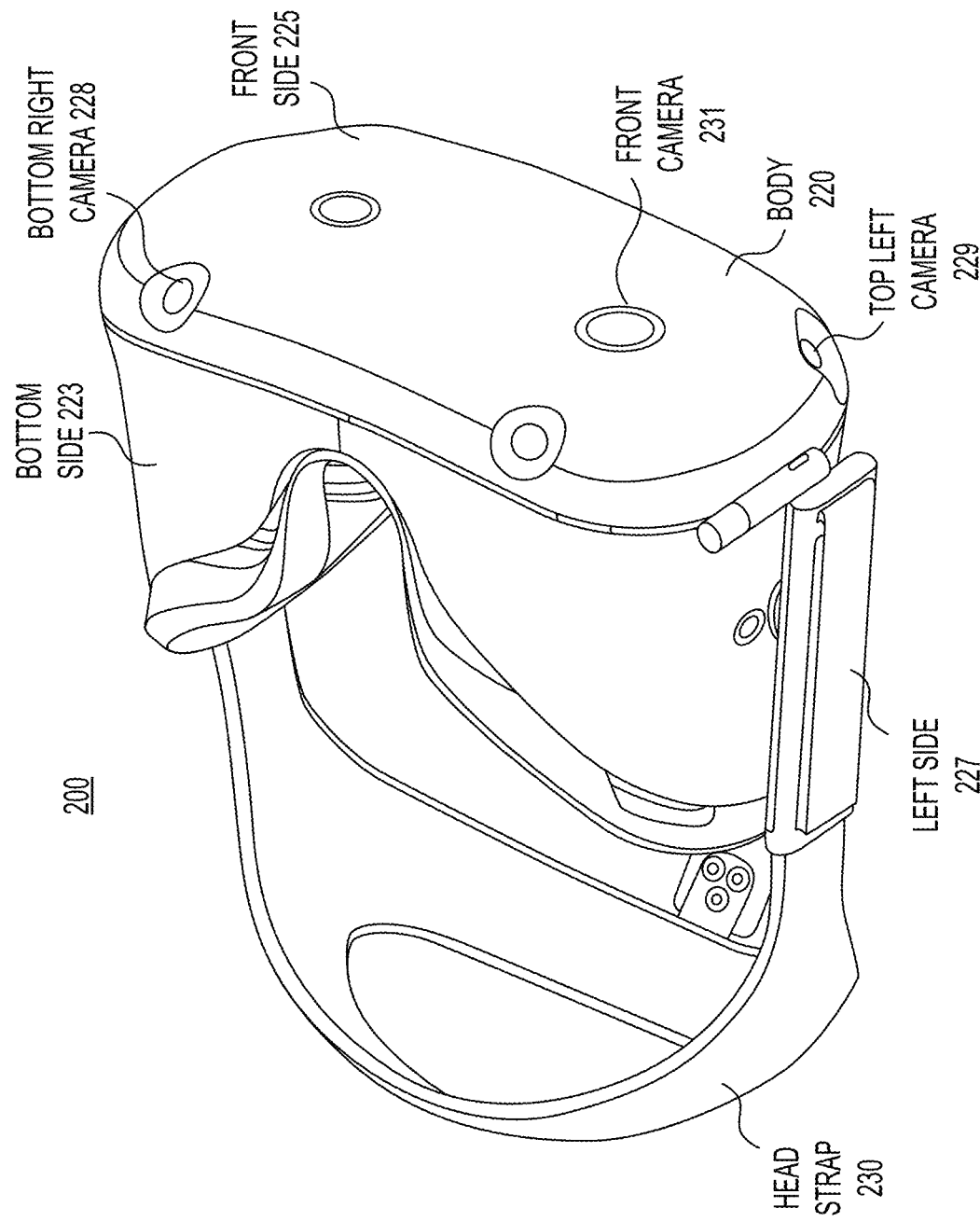
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the HMD device 200 may also include external cameras on the top/bottom/left/right/front exterior, such as bottom right camera 228, top left camera 229, and front camera 231, as shown. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

As mentioned above, virtual reality (VR) head-mounted displays (HMDs) may provide nearly complete visual immersion, using a pair of near-eye displays to create wide-field-of-view, stereoscopic images. However, such immersion comes at the cost of visual isolation from the user's physical environment. It should be appreciated that, by definition, VR displays block light from the outside world. For certain applications, a direct view of the nearby environment, however, may be necessary. To this end, augmented reality (AR) may use near-eye displays to support optical see-through. Yet, modern AR displays may still only achieve limited fields of view, unlike blocked-light VR. Thus, video see-through VR has been proposed as a potential solution, and in particular, using any number of passthrough techniques to transform imagery collected by outward-facing cameras to enable the user to see their surroundings while wearing a VR headset.

It should be appreciated that VR "passthrough" systems may not actually directly pass through anything (e.g., light). Rather, such systems may achieve this "passthrough" effect by reprojecting images/videos to appear as if it were passed through and captured from the user's perspective. Notably, this may be often approximated, with studies establishing the value of ocular parallax (i.e., updating reconstructions to track the user's constantly moving pupils). While pupil-tracked passthrough may be the ultimate goal, state-of-the-art techniques may reproject camera data to the nominal, fixed position of the eyes, while accepting other artifacts resulting from the computational limits of mobile devices.

Real-time (or near real-time) view synthesis lies at the core of achieving compelling passthrough experiences. That said, virtual reality (VR) headsets may not typically be equipped to support by any number of traditional passthrough techniques. For example, commercial VR displays may be stereoscopic and refresh at 72-144 frames per second, support wide fields of view (>90 degrees, horizontally), and may achieve high resolutions (>15 pixels/degree). For VR passthrough, a typical scenario may involve user's manipulating near-field objects with their own hands and observing dynamic environments—resulting in large regions with missing data, due to disocclusions, and preventing offline reconstruction from prior observations.

Figure 3:
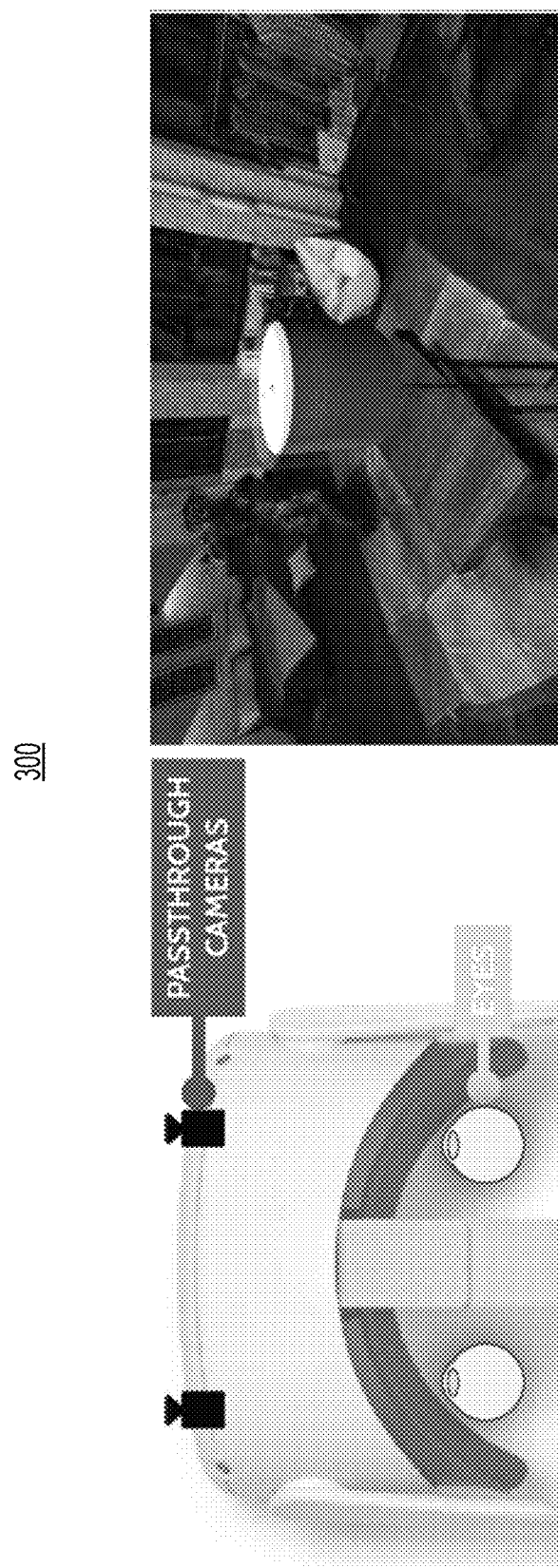
FIG. 3 illustrates a top view of a near-eye display in the form of a head-mounted display (HMD) device with passthrough cameras, according to an example.

Given these algorithmic challenges, headset designers and manufacturers may assist passthrough by placing cameras as close to the user's eyes as possible, asking the algorithm to only make modest changes. FIG. 3 illustrates a top view 300 of a near-eye display in the form of a head-mounted display (HMD) device with passthrough cameras, according to an example. However, as shown in FIG. 3, cameras may simply not be exactly co-located with the user's eyes. They may be several centimeters away, resulting in significant viewpoint differences.

Accordingly, the systems and methods described herein may provide solutions to optimize performance of a minimal passthrough architecture. In some examples, this may involve some mechanical reconfiguration, such as placing a stereo pair of RGB cameras on the front of a VR headset (as shown in FIG. 2), identify that such a minimal configuration offers a practical trade-off between hardware size, weight, and power and the computational overhead of the passthrough algorithm. However, when optimal placement of the cameras is considered to work in concert with the machine learning (ML) based passthrough algorithm described herein, a camera baseline may be adjusted to mitigate reprojection artifacts and improve overall image quality/resolution.

In other words, the systems and methods described herein may provide an efficient, high-quality technique for real-time (or near real-time) stereoscopic view synthesis from stereo inputs, and concurrently minimizing or eliminating limitations of conventional systems and techniques. Using the approach described here, the systems and methods may leverage recent advances in deep learning, solving passthrough as an image-based neural rendering problem. Furthermore, by applying learned stereo depth estimation and image reconstruction networks to produce the eye-viewpoint images via an end-to-end approach, the systems and methods may also be configured to be compatible with any number of past, present, and future mobile VR computational resources and requirements.

The systems and methods may provide mechanical configurations that includes an adjustable stereo camera baseline, optimizing its construction for evaluating view synthesis methods that meet VR passthrough requirements. Moreover, the systems and methods described herein may analyze impact of camera placement on VR passthrough image quality. To do this, key disocclusions may be mitigated by adopting wider camera baselines than the user's interpupillary distance (IPD). Further, the system and methods may provide a learned view synthesis method, technique, or approach that is tailored for real-time VR passthrough, while concurrently suppressing key artifacts and achieving higher image quality.

As discussed, the systems and methods may provide learned view synthesis for tailored for real-time VR passthrough using: (1) mechanical configurations that includes an adjustable stereo camera baseline; and (2) algorithms based on machine learning (ML) techniques.

With regard to (1), an exemplary hardware configuration may include stereo RGB cameras, as the input to the passthrough system. Notably, hardware design may involve optimization with regard to placement of the stereo cameras on the headset. It should be appreciated that an ideal objective here may be to maximize information captured from a 3D scene by the stereo cameras that is necessary for reconstructing the target novel view images. In other words, the placement of the camera(s) may be to minimize any number of disocclusion regions. As used herein, disocclusion may refer to one or more points (e.g., 3D points) that would be visible in the target novel views but are "occluded" in the input views and thus cannot be faithfully recovered by view synthesis.

Figure 4:
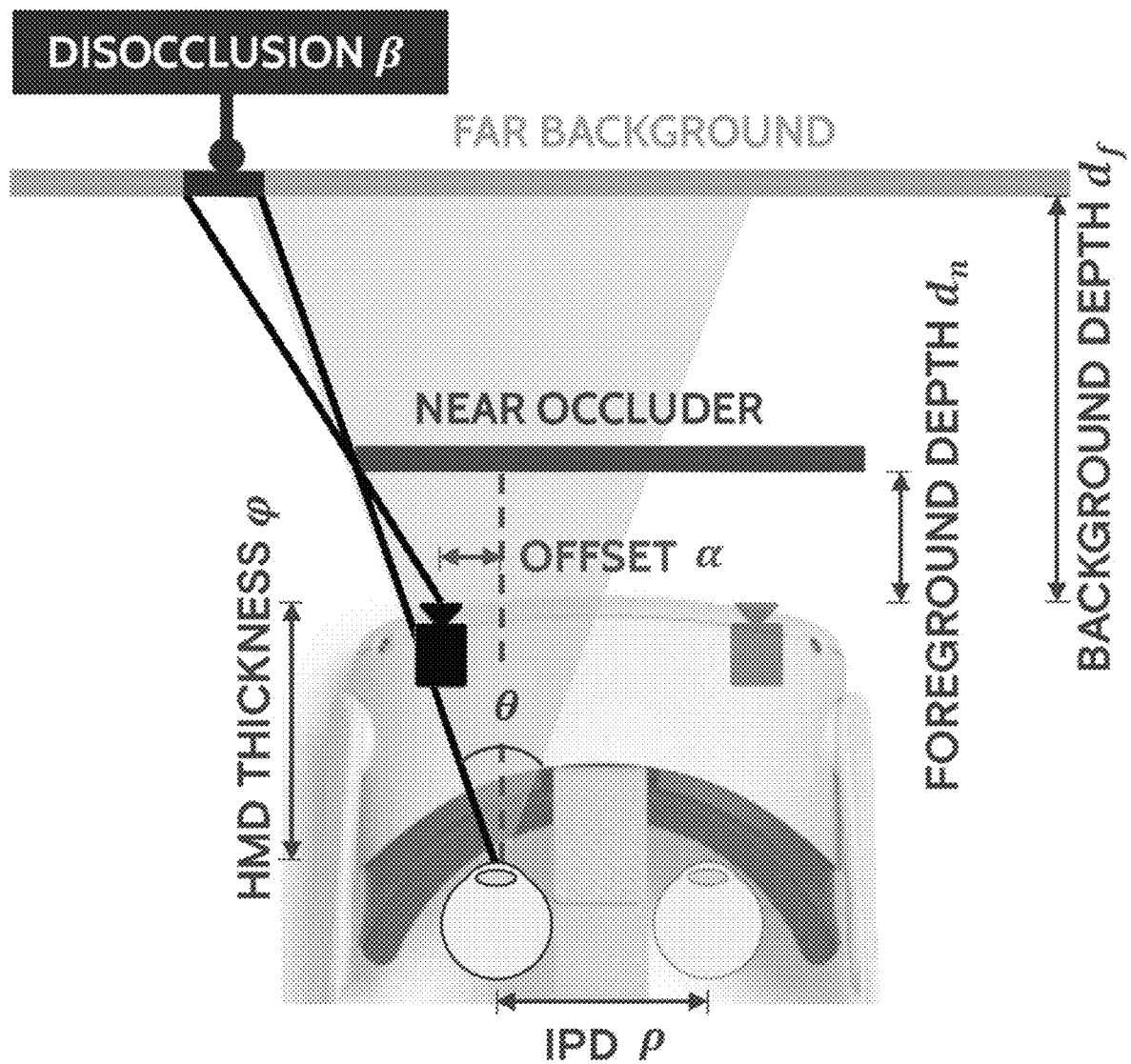
FIG. 4 illustrates a top view of a near-eye display in the form of a head-mounted display (HMD) device with passthrough cameras and disocclusion, according to an example.

FIG. 4 illustrates a top view 400 of a near-eye display in the form of a head-mounted display (HMD) device with passthrough cameras and disocclusion, according to an example. Here, stereo cameras may be available as part of the headset and they may be located, for example, at the same plane as the eyes, similar to that shown in FIG. 2. Both cameras, in this particular example, may face forward in parallel and may remain symmetric to the center axis of the HMD on its front surface. Under such constraint, free parameters of the camera placement may reduce to the horizontal offset a between each camera and its corresponding eye. Intuitively, α may be set to 0 so as to minimize distance between the input and target viewpoints for easing the view synthesis difficulty. In some examples, however, a may also be increased to a certain extent to reduce the disocclusion and thus favor the novel view reconstruction.

As shown in FIG. 4, disocclusion may appear in the target view due to the viewpoint difference between the camera and the eye. The size of the disocclusion region β may be derived, as shown in Eq. (1) below:

$$\beta = \max\left(0, \left(\varphi \cdot \tan\frac{\theta}{2} - \alpha\right)\right) \cdot \left(\frac{d_f}{d_n} - 1\right)$$

where φ denotes the distance between the camera and the eye in depth axis (approx the HMD thickness), dn and df denote the depth of the near occluder and the background respectively (dn<df), and θ∈[0, π) measures the angular region within which the disocclusion is aimed to eliminated. It should be appreciated that under the stereo camera constraint, only horizontal disocclusion may be reduce/eliminated.

From Eq. (1), when $$\alpha \geq \varphi \cdot \tan\frac{\theta}{2},$$

disocclusion β may disappear. Given ρ as the target IPD, the required minimal stereo camera baseline may become:

$$\left(\rho + 2 \cdot \varphi \cdot \tan\frac{\theta}{2}\right).$$

From Eq. (1), reducing HMD thickness φ may reduce disocclusion) β. This may suggest that the passthrough problem can benefit from future, more compact headset designs. In addition, disocclusion β may also increase when foreground objects do are closer.

It should be appreciated that, in some examples, the stereo cameras may be placed on a linear translation stage to allow configurable camera baselines for research exploration purposes. The supported camera baseline may range from 5.4 cm to 10 cm in some examples. In some examples, the camera baseline may be set to 10 cm. This value may support θ=25° angular region where the disocclusion is substantially eliminated for sampled IPD ρ=6 cm, or equivalently θ=18° for ρ=7 cm. The distance between the cameras and the eyes in depth axis may also be φ=9.3 cm in some examples. It should be noted that the RGB cameras may run at 30 Hz with 720p resolution and 90° field of view (FOV).

With regard to (2), a machine learning (ML) based algorithm may be provided to help solve the passthrough as a per-frame, image-based rendering problem, taking stereo color camera images as input and producing stereo images at target eye views.

Figure 5:
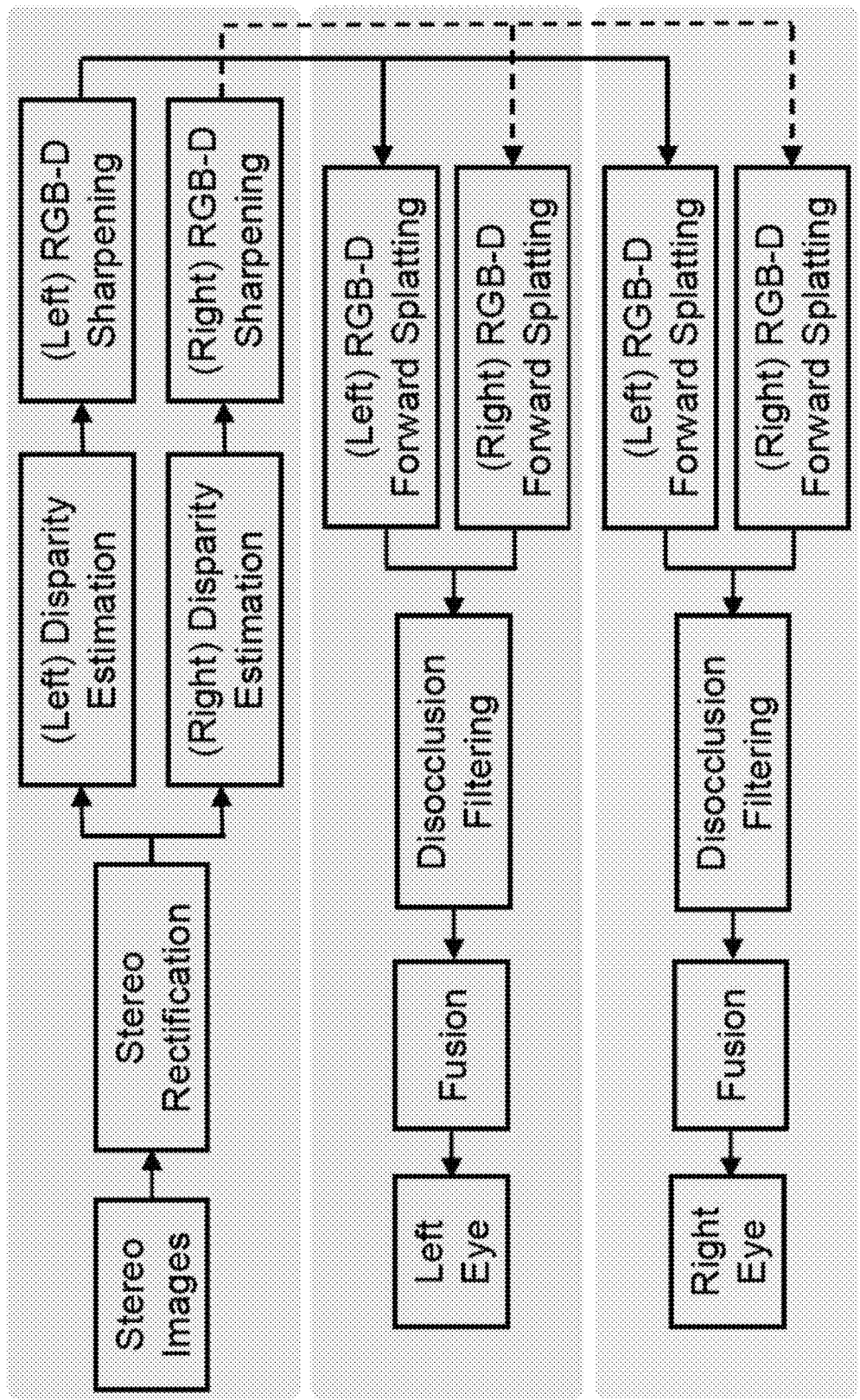
FIG. 5 illustrates a flow diagram of a technique for machine learning (ML) based stereoscopic view synthesis, according to an example.

FIG. 5 illustrates a flow diagram 500 of a technique for machine learning (ML) based stereoscopic view synthesis, according to an example. At high level, the technique may represent the scene with 2D color and depth (RGBD) images. A depth map may be estimated at each of the input views by deep-learning-based disparity estimation, described in more detail below. The RGB-D pixels of both input views may then splatted to each target view, described in more detail below, before being fed into a neural network for final view reconstruction, also described in more detail below. To reduce splatting artifacts (e.g., flying-pixels) due to the ambiguity of depth at its discontinuities, the technique may filter the RGB-Ds at each input view, described in more detail below, before the splatting. The technique may further process to reduce disocclusion artifacts in the splatted RGBs, described in more detail below, before passing them to final reconstruction.

With regard to depth estimation, input color pairs may be rectified at each frame, reducing the disparity estimation from a 2D correspondence matching to the more efficient 1D matching problem. Specifically, neural-network-based approaches may be leveraged and provided to produce higher quality depth maps. Furthermore, a recurrent all-fields field transform (RAFT)-Stereo algorithm or other similar algorithm may be provided to estimate a disparity map at each of stereo input views, which may then be converted to depth maps using pre-calibration parameters. The process is given in Eq. (2) for clarity:

$$d_l = \text{stereo\_depth}(c_l, c_r)$$

$$d_r = \text{flip}(\text{stereo\_depth}(\text{flip}(c_r), \text{flip}(c_l)))$$

where $c_l$ and $c_r$ may represent the rectified left and right input image, respectively; $d_l$ and $d_r$ the output inverse depth maps at the left and right view, respectively; stereo_depth the depth estimation algorithm; and flip represents the operator to horizontally flip the image. The flip operations may satisfy the requirement on the expected sign of disparity values by the stereo depth estimation inference. Note that, in accordance with the use of RAFT-Stereo or similar algorithms, the depth herein may be in diopter unit (i.e., inverse depth) unless otherwise indicated.

Figure 6A:
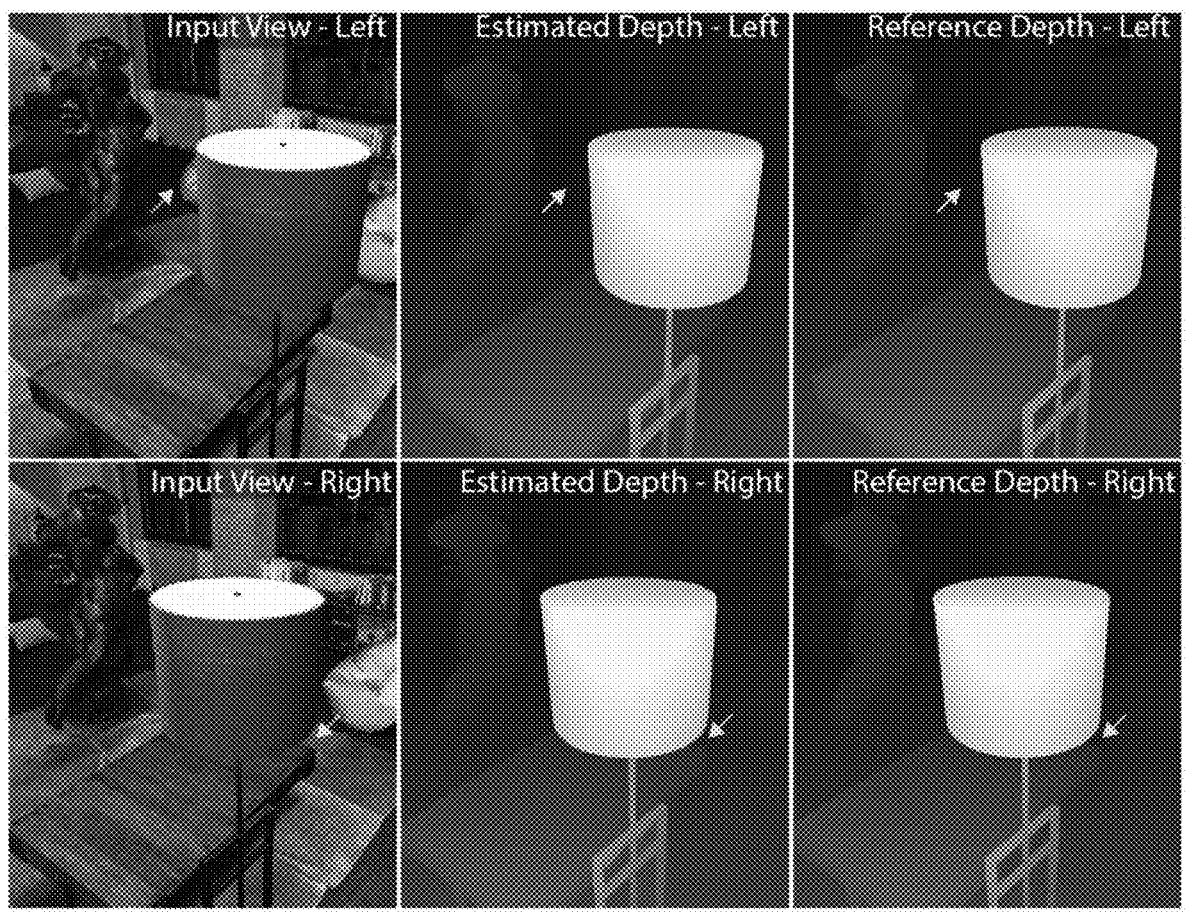
FIGS. 6A-6H illustrates various comparative images with or without machine learning (ML) based stereoscopic view synthesis, according to an example.
Figure 6B:
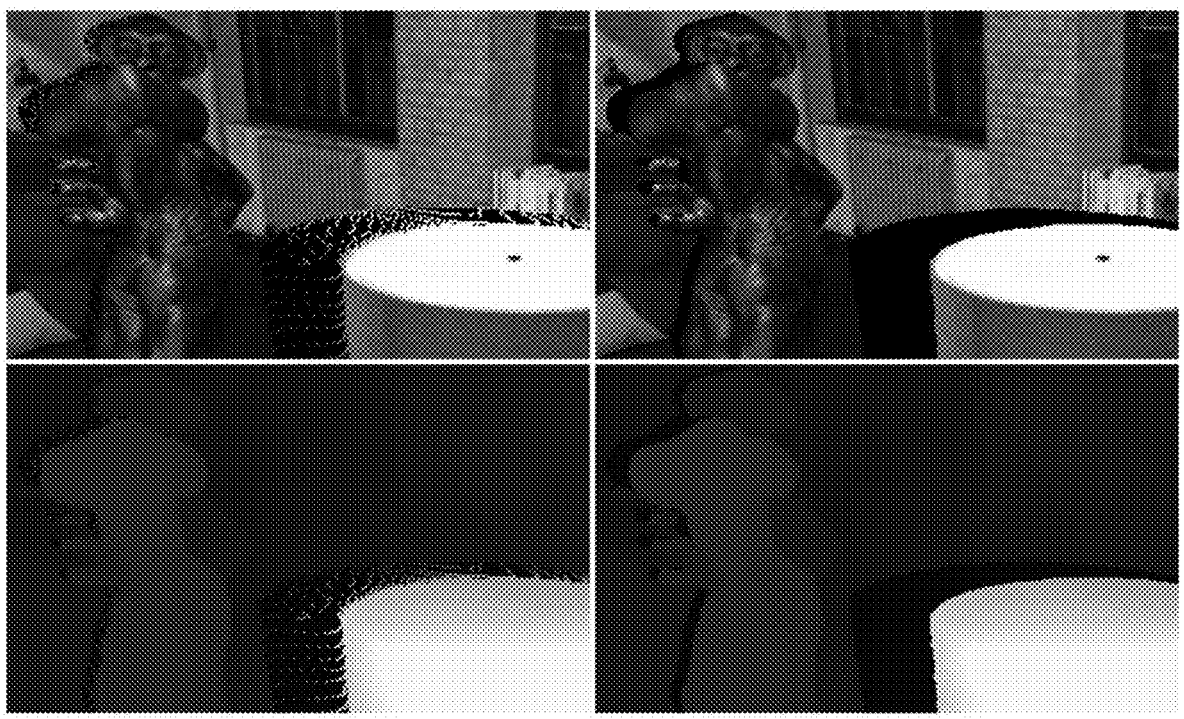

FIGS. 6A-6G illustrates various comparative images with or without machine learning (ML) based stereoscopic view synthesis, according to an example. FIG. 6A shows example estimated depth at different stereo input views 600A, which approximate the ground truth depth well. For regions that are only visible in one of the input views, the depth estimation network may still produce reasonable results from neighbor pixels and monocular depth cues learned at training and a plane-sweep-volume approach in multi-plane image (MPI). This may be also one of the reasons that the depth may be estimated at each input view, since the two depth maps provide complementary information of the scene geometry. As shown, the estimated depths may approximate the reference well. The arrows here may highlight example regions that are only visible in one of the stereo input views but reasonable depth is estimated from monocular depth clues.

With regard to RGB-D sharpening, the estimated depth maps may align with corresponding color images visually well. However, if they were directly used for view reprojection, flying pixels may occur at the disoccluded regions in the reprojected images due to depth ambiguity at depth discontinuities, as shown in the views 600B of FIG. 6B. Here, splatted images at target view with versus without RGB-D sharpening may be shown. It should be appreciated that the sharpening process may significantly reduce flying pixels in the disoccluded regions.

To reduce the problem, the color images and estimated depth maps may be sharpened at depth discontinuities. Specifically, the depth edges may be detected and then the RGB-D values of the edge pixels may be set to their nearest-neighbor, non-edge pixels.

Another benefit of our RGB-D sharpening is that it may help produce clean depths in the splatted image space, which are important for the disocclusion filtering to work properly.

With regard to forward splatting, the color image may be reconstructed at each target eye view, from the color and depth at input stereo views, with neural networks. To reduce the required receptive field of the neural network, warp each input view may be warped to the target view. Since the depths are estimated at the input views, forward warping may be used. Compared to its counterpart backward warping, forward warping may likely introduce holes due to disocclusion, and multiple source pixels could map to the same pixel in the warped image space due to newly introduced occlusion. Both cases may often occur in the pass-through problem. Thus, it may be helpful to first focus on the issue caused by the newly introduced occlusion, and address disocclusion holes separately.

In some examples, the estimated depth may be obtained at each input view, providing visibility cues of 3D points. Although any number splatting techniques may be used, the systems and methods may use a softmax splatting technique, which may also be used for video frame interpolation. This technique may blend the pixels that were mapped to the same target pixel, applying pixel-wise importance weights defined as a measure of occlusion. Here, the importance weights w may be defined to be a function of the estimated inverse depth d, as given in Eq. (3) below:

$$w = \left(\frac{d - d_{min}}{d_{max} - d_{min}} + \frac{1}{9}\right) \cdot 36$$

where dmin and dmax are the minimum and maximum of the inverse depth map d, and the heuristic constants are chosen to map the weights to the range [4, 40], which works well in our experiments. The metric w assigns higher weights to the source pixels closer to the cameras, in the warped image space. The forward splatted colors from the input stereo views may be denoted as $\{\bar{c}_l, \bar{c}_r\}$ and the splatted inverse depths from the input stereo views as $\{\bar{d}_l, \bar{d}_r\}$.

Figure 6C:
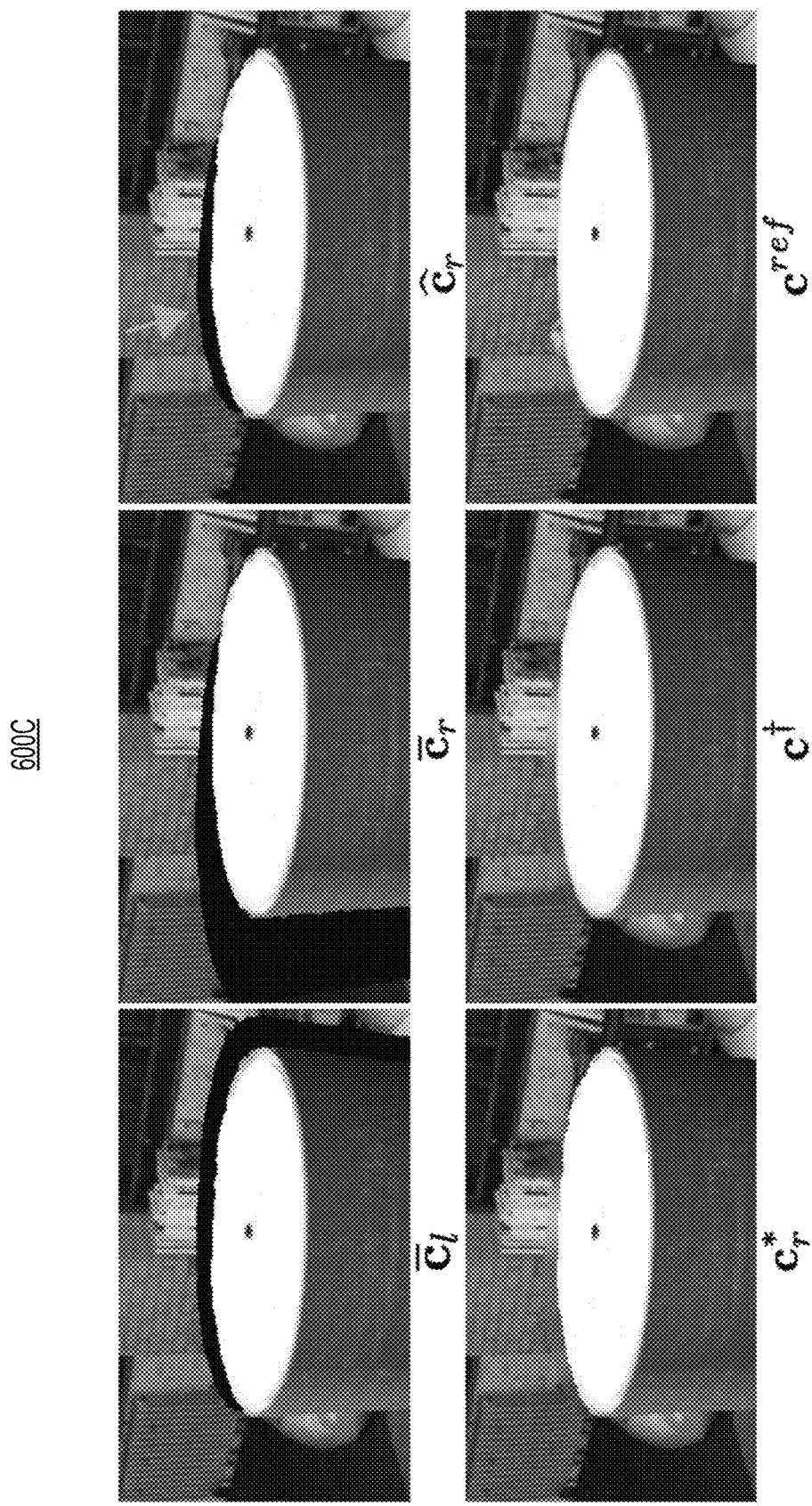
Figure 6D:
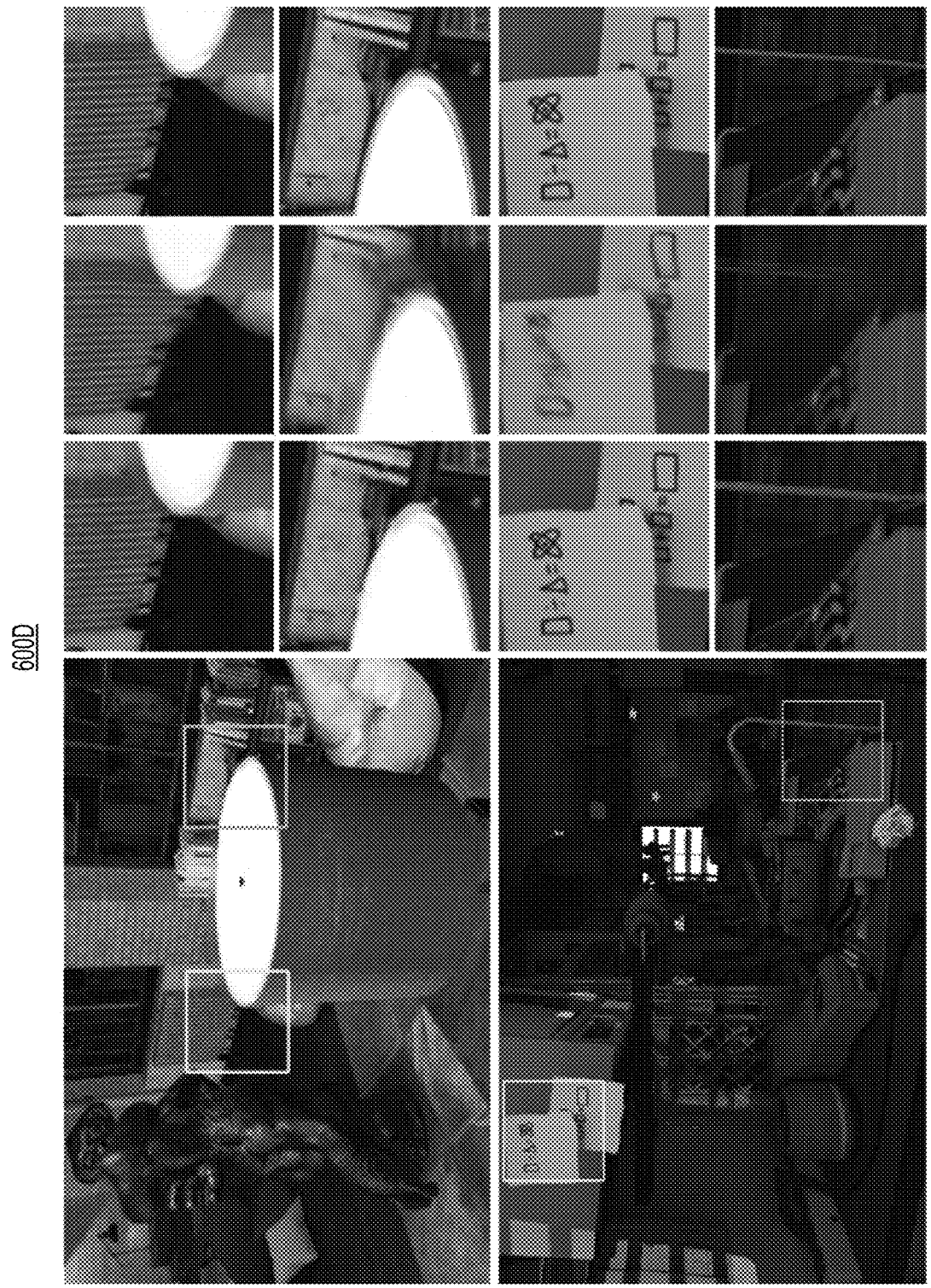
Figure 6E:
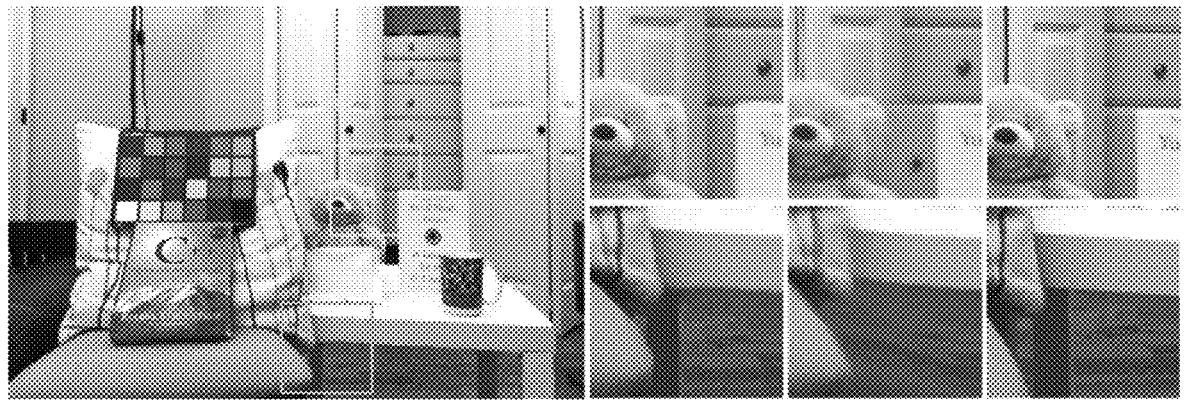
Figure 6F:
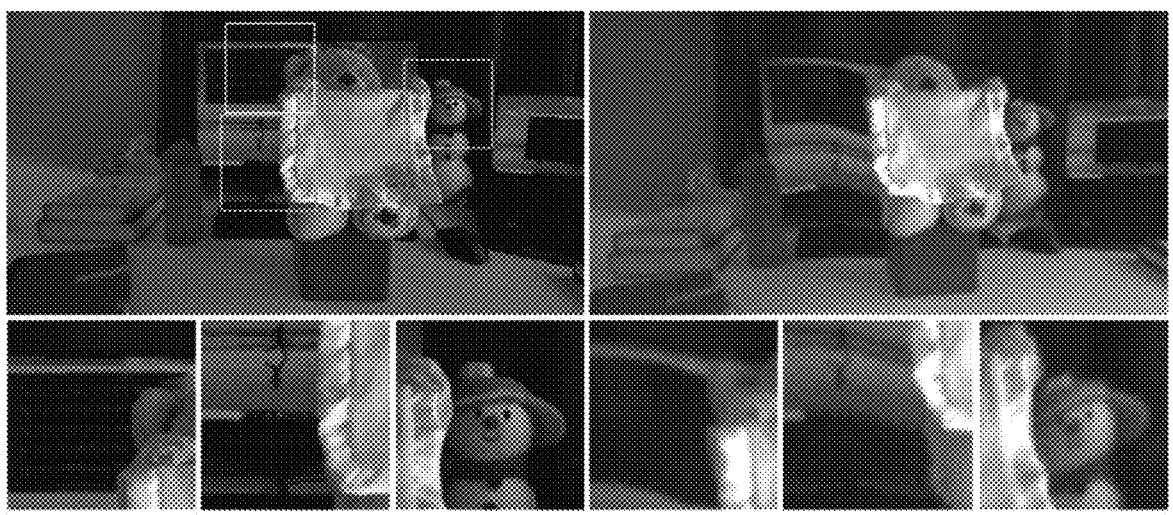
Figure 6G:
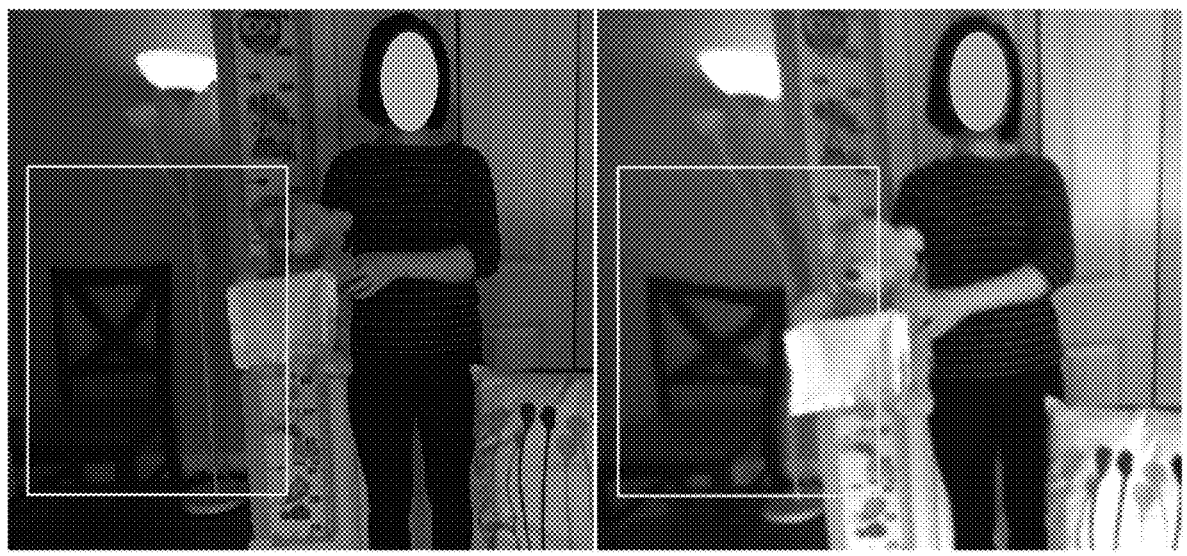

With regard to disocclusion filtering, the splatted images at the target view typically may contain holes, as discussed above, due to disocclusion, as shown in the views 600C of FIG. 6C. Here, example intermediate variables and reconstruction for one eye view may be shown. The arrow points to example of full disocclusion holes. In order to provide disocclusion filtering, the disocclusion holes may be divided into two categories and then treated separately, e.g., partial disocclusion, defined as the hole regions that occur in only one of the splatted images either $\bar{c}_l$ or $\bar{c}_r$, or full disocclusion, defined as the ones that occur in both $\bar{c}_l$ and $\bar{c}_r$.

The partial disocclusion may be removed, for example, by blending cl and cr as $$\hat{c}_l = (1 - m_l) \odot \bar{c}_l + m_l \odot \bar{c}_r$$

$$\hat{c}_r = (1 - m_r) \odot \bar{c}_r + m_r \odot \bar{c}_l$$

where the pixel-wise masks ml and mr are defined on the splatted depth dl and dr, as in Eq. (5) below.

$$m_l = \begin{cases} 1 & \text{if } \bar{d}_l < \epsilon \\ 0 & \text{otherwise} \end{cases}, m_r = \begin{cases} 1 & \text{if } \bar{d}_r < \epsilon \\ 0 & \text{otherwise} \end{cases}$$

where $\epsilon = 0.1$ and ml, r indicates the zero-value pixels in the splatted depth dl, r. An example ĉ is shown in FIG. 6C.

The full disocclusion, however, may not be faithfully recovered as the input stereo images contain no information of those regions. The systems and methods described herein may provide a depth-assisted, anisotropic low-pass filter to produce visually more stable results. By observing that the disoccluded regions should be the background objects rather than the foreground occluders, the technique may fill in the disoccluded pixels with smoothed colors of only the relatively far objects in the local neighborhood, as given in Eq. (6) and Algorithm 1, shown below:

$$\hat{m} = m_l \odot m_r$$

$c_l^* = \text{full\_disocclusin\_filtering}(\hat{c}_l, \overline{d}_l, \hat{m}, k)$ $c_r^* = \text{full\_disocclusin\_filtering}(\hat{c}_r, \overline{d}_r, \hat{m}, k)$

---
ALGORITHM 1
---

Input: Color image ĉ, depth d̄, occlusion mask m̂, kernel k
Output: Filtered color image c*
  for each pixel i do
    if m̂(i) is 0 then
      c*(i) = ĉ(i)
    else
      $\overline{d}_{min}^N, \overline{d}_{max}^N, c_{acc}, w_{acc}$ = MAX, MIN, 0, 0
      for each pixel j in local neighborhood $N_i$ do
        if d̄(j) > 0.01 then
          $\overline{d}_{min}^N, \overline{d}_{max}^N$ = min ($\overline{d}_{min}^N$, d̄(j)), max ($\overline{d}_{max}^N$, d̄(j))
      for each pixel j in local neighborhood $N_i$ do
        if d̄(j) > 0.01 and d̄(j) < 0.5($\overline{d}_{min}^N + \overline{d}_{max}^N$) then
          $c_{acc}$ += ĉ(j) · k(i,j)
          $w_{acc}$ += k(i,j)
      if $w_{acc}$ > 0 then
        c*(i) = $c_{acc}/w_{acc}$
      else
        c*(i) = ĉ(i)

where ⊙ denotes the Hadamard product. The pixel-wise mask m̂ indicates full disocclusion pixels, k denotes a low-pass kernel, and a zero-mean 2D Gaussian filter with size 29×29 and standard deviation 7 pixels may be used.

One benefit of the partial and full disocclusion filtering as described herein may be illustrated by comparing test results, as shown in Table 2 below:

TABLE 2

| | PSNR↑ | SSIM↑ | STRRED↓ |
|---|---|---|---|
| MPI | 27.38 | 0.8818 | 105.74 |
| Ours | 30.74 | 0.9579 | 51.78 |
| Ours (without Eq.7) | 28.66 | 0.9475 | 95.33 |
| Ours (without Eq.5, without Eq.7) | 29.02 | 0.9456 | 99.33 |

With regard to fusion, the filtered color from both stereo views may then be fed to a neural network for final reconstruction at the target eye view, as denoted in Eq. (7) as shown below:

$c^\dagger = \text{fusion}(c_l^*, c_r^*)$ where the fusion network is a lightweight U-Net with skip connections, with its detailed architecture given in Table 1, as shown below.

TABLE 1

| Layer | Input tensor | Channels in/out |
|---|---|---|
| conv0 | concat($c_l^*, c_r^*$) | 6/16 |
| conv1 | conv0 | 16/16 |
| conv2 | down(conv1) | 16/32 |
| conv3 | conv2 | 32/32 |
| conv4 | down(conv3) | 32/64 |
| conv5 | conv4 | 64/64 |
| conv6 | concat(up(conv5), conv)) | 96/32 |
| conv7 | layer | 32/32 |
| conv8 | concat(up(conv7), conv1) | 48/16 |
| conv9 | conv8 | 16/16 |
| conv10 | conv9 | 16/3 |

It should be appreciated that the fusion network may run once for each of the two target eye views, as illustrated in the flow diagram 500 of FIG. 5. In some examples, fusion may be necessary, among other things, to further reduce reprojection errors and aliasing artifacts in $c_l^*, c_r^*$.

With regard to training the machine learning (ML) based technique provide by the systems and methods described herein, any number of training loss functions may be used. For instance, the training loss function for the examples described herein may be defined as follows:

$$10 \cdot \|(1-\hat{m}) \odot (c^\dagger - c^{ref})\|_1 - \|(1-\hat{m}) \odot \text{ssim}(c^\dagger, c^{ref})\|_1$$

where ssim is the pixel-wise structural similarity index measure The mask (1−m̂) may be applied to exclude the full disocclusion regions from the loss, to prevent learning inpainting at those regions (which might lead to inconsistent left/right completion that in turn could worsen the user experience when observed in the stereoscopic display). The stereo depth network may reuse the pretrained RAFT-Stereo model with frozen weights at training. The method/technique may be trained on a synthetic dataset similar to the random scenes techniques, which may contain, in some examples, 80 scenes, and each scene contains 20 image sequences with resolution 512×512 rendered at varying viewpoints, i.e., two views serve as the input stereo with 10 cm baseline, and the rest may be the target output views that are 9.3 cm behind the input views and with baselines ranging from 4.8 to 8.0 cm. Note that the trained network may be applied to other camera/IPD configuration and resolutions at test time. The method/technique using an ADAM optimizer with default parameters for 240k iteration may also be trained. Each iteration may run on a batch with size 1, and the loss may be computed on 8 randomly selected output views.

After training, the method may be run or operated in C++ and CUDA/CuDNN for inference optimization, and the technique may be integrated with the HMD SDK for demonstration/operation, where each GPU may responsible for one depth estimation and one eye-view reconstruction.

As there is little recent work on real-time view synthesis, results from the systems and methods described herein may be compared to a representative MPI method of some typical approaches that also takes stereo images as inputs. It should be noted that MPI may run at several seconds for generating the MPI representation and another several seconds for rendering stereo eye views at 720p resolution, in Tensor-Flow on our GPUs. Although follow-up MPI work may provide some improved quality, they are substantially slower due to the need to generate multiple MPIs per frame and the use of 3D convolutional networks, making them even more inapplicable relative to the solutions described herein.

As a result, for comparison purposes, two synthetic datasets from 3D environments with dynamic objects may be provided, denoted as DanceStudio and ElectronicRoom. Each dataset may contain 5 videos with simulated VR head motions, each video contains 30 frames, and each frame contains input stereo views (with baseline 10 cm) and target eye views (with IPD 6 cm, depth-axis offset 9.3 cm), at 720p resolution. Both scenes may have different enough appearance and geometry than our static training datasets.

The methods may be evaluated with PSNR, SSIM and Spatio-Temporal Entropic Difference (STRRED), where the latter is for video quality and temporal stability assessment. As reported in Table 2, the approach provided by the systems and methods described herein may outperform MPI by a large margin on all metrics. Example result images are shown in the images 600D of FIG. 6D. Here, MPI may present more obvious artifacts especially stretching and repeated textures at disocclusion regions Furthermore, the methods may be compared qualitatively on real data captured by our prototype, as shown in the images 600E of FIG. 6E. Since the ground truth images may not be captured at target eye views for quantitative comparisons, closest patches from the input views may be provided for visual reference about the scenes.

Regarding the passthrough system, the systems and methods may be compared to a couple of related commercial VR displays. Example results are shown in the images 600F and the images 600G in the FIGS. 6F and 6G, respectively. The main limitation of these commercial VT display passthrough approaches is that the reconstructed mesh can be inaccurate at depth discontinuities and disocclusion regions, causing noticeable distortion and stretching artifacts. In contrast, the approach described herein may produce much more accurate results, and additionally in color and at better resolutions.

Figure 6H:
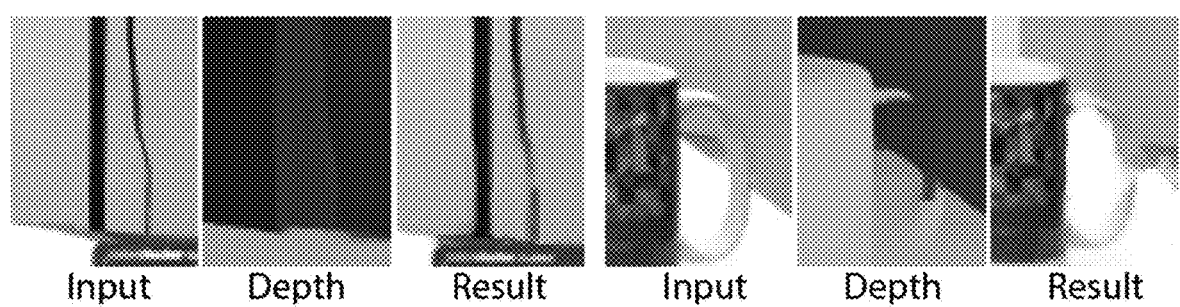

The quality of our results may be partly affected by the quality of the real-time depth estimation. While the depth estimation produces reasonable results in general, it may fail at objects with challenging geometry details or view-dependent materials, or when the monocular depth cues lack. Examples are shown in images 600H in FIG. 6H. As the depth estimation module of our framework can be easily upgraded, any future improvement on real-time depth estimation could benefit the systems and methods described herein directly. It should be appreciated that temporal frames may also be leveraged for further improving the image quality as well as temporal stability.

Because novel view synthesis remains a core challenge within the host of computer vision and graphics problems (e.g., light field imaging, light field displays, free-viewpoint video rendering, etc.), the systems and methods described herein may offer a solution that introduces a color passthrough prototype with high-quality results in real-time or near real-time. By providing a new hardware configuration and a learned view synthesis method/technique specifically tailored for the passthrough problem, user experience in artificial and real worlds may be enhanced.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A display system, comprising:
 a head-mounted display (HMD) having a pass-through configuration, comprising:
 at least two exterior-facing color stereo cameras mounted on a front face of the HMD and on a visual plane of both of a user's eyes, wherein the at least two exterior-facing color stereo cameras collects images;
 a processor to receive the collected images to perform stereo view synthesis; and
 a memory storing instructions, which when executed by the processor, cause the processor to perform stereo view synthesis by performing:
 depth estimation;
 sharpening;
 splatting;
 disocclusion filtering to minimize a disocclusion region, wherein the disocclusion region is due to a viewpoint difference caused by a lateral offset in the visual plane between each of the at least two exterior-facing color stereo cameras and a matching one of both of the user's eyes; and
 fusion.

2. The display system of claim 1, wherein a size $\beta$ of the disocclusion region is represented by the following expression:

$$\beta = \max\left(0, \left(\varphi \cdot \tan\frac{\theta}{2} - \alpha\right)\right) \cdot \left(\frac{d_f}{d_n} - 1\right)$$

where $\varphi$ denotes a distance between the at least two exterior-facing color stereo cameras and both of the user's eyes in the visual plane,
$d_n$ denotes a depth of a near occluder, and
$d_f$ denotes a depth of a background, where $d_n < d_f$.

3. The display system of claim 2, wherein the disocclusion region size $\beta$ is minimized in accordance with the following expression:

$$\alpha \geq \varphi \cdot \tan\frac{\theta}{2},$$

where $\alpha$ represents the lateral offset in the visual plane between each of the at least two exterior-facing color stereo cameras and the matching one of both of the user's eyes, and
$\theta$ represents an angular region within which disocclusion is to be eliminated, where $\theta \in [0, \pi)$.

4. The display system of claim 3, wherein a minimal stereo camera baseline is represented by the following expression:

$$\left(\rho + 2 \cdot \varphi \cdot \tan\frac{\theta}{2}\right),$$

where $\rho$ represents a target interpupillary distance (IPD).

5. The display system of claim 1, wherein the at least two exterior-facing stereo color cameras are placed on a linear translation stage to allow configurable camera baselines, which range from 5.4 cm to 10 cm.

6. The display system of claim 1, wherein the depth estimation is based on a depth map calculated at each stereo input view by deep-learning-based disparity estimation using a neural network.

7. The display system of claim 6, wherein the depth estimation uses input color pairs to be rectified at each frame in order to reduce the deep-learning-based disparity estimation from a 2D correspondence matching solution to a more efficient 1D matching solution.

8. The display system of claim 6, wherein the depth estimation uses a Recurrent All-Pairs Field Transform (RAFT)-stereo algorithm to calculate a disparity map at each stereo input view, which may then be converted to depth maps using pre-calibration parameters, which may be expressed as follows:

$$d_l=\text{stereo\_depth}(c_l,c_r)$$

$$d_r=\text{flip}(\text{stereo\_depth}(\text{flip}(c_r),\text{flip}(c_l)))$$

where $d_l$ represents an output inverse depth map at a left view,
$d_r$ represents an output inverse depth map at a right view,
$c_l$ represents a rectified left input image,
$c_r$ represents a rectified right input image,
stereo_depth represents a depth estimation algorithm, and
flip represents an operator to horizontally flip an image.

9. The display system of claim 8, wherein the flip operator to horizontally flip the image satisfies any requirement on an expected sign of disparity values by a stereo depth estimation inference.

10. A method, comprising:
collecting, from at least two exterior-facing color stereo cameras mounted on a front face of a head-mounted display (HMD) and on a visual plane of both of a user's eyes in a pass-through configuration, images; and
providing stereo view synthesis using the collected images by performing:
depth estimation;
sharpening;
splatting;
disocclusion filtering to minimize a disocclusion region, wherein the disocclusion region is due to a viewpoint difference caused by a lateral offset in the visual plane between each of the at least two exterior-facing color stereo cameras and a matching one of both of the user's eyes; and
fusion.

11. The method of claim 10, wherein a size $\beta$ of the disocclusion region is represented by the following expression:

$$\beta = \max\left(0, \left(\varphi \cdot \tan\frac{\theta}{2} - \alpha\right)\right) \cdot \left(\frac{d_f}{d_n} - 1\right)$$

where $\varphi$ denotes a distance between the at least two exterior-facing color stereo cameras and both of the user's eyes in the visual plane,
$d_n$ denotes a depth of a near occluder, and
$d_f$ denotes a depth of a background, where $d_n<d_f$.

12. The method of claim 11, wherein the disocclusion region size $\beta$ is minimized in accordance with the following expression:

$$\alpha \geq \varphi \cdot \tan\frac{\theta}{2},$$

where $\alpha$ represents the lateral offset in the visual plane between each of the at least two exterior-facing color stereo cameras and the matching one of both of the user's eyes, and
$\theta$ represents an angular region within which disocclusion is to be eliminated, where $\theta \in [0, \pi)$.

13. The method of claim 12, wherein a minimal stereo camera baseline is represented by the following expression:

$$\left(\rho + 2 \cdot \varphi \cdot \tan\frac{\theta}{2}\right),$$

where $\rho$ represents a target interpupillary distance (IPD).

14. The method of claim 10, wherein the depth estimation is based on a depth map calculated at each stereo input view by deep-learning-based disparity estimation using a neural network.

15. The method of claim 14, wherein the depth estimation uses input color pairs to be rectified at each frame in order to reduce the deep-learning-based disparity estimation from a 2D correspondence matching solution to a more efficient 1D matching solution.

16. A non-transitory computer-readable storage medium having an executable stored thereon, which when executed instructs a processor to:
collect, from at least two exterior-facing color stereo cameras mounted on a front face of a head-mounted display (HMD) and on a visual plane of both of a user's eyes in a pass-through configuration, images; and
provide stereo view synthesis using the collected images by performing:
depth estimation;
sharpening;
splatting;
disocclusion filtering to minimize a disocclusion region, wherein the disocclusion region is due to a viewpoint difference caused by a lateral offset in the visual plane between each of the at least two exterior-facing color stereo cameras and a matching one of both of the user's eyes; and
fusion.

17. The display system of claim 5, wherein the configurable camera baseline is 10 cm to support at least one of:
an angular region $\theta=25°$ for $\rho=6$ cm; or
an angular region $\theta=18°$ for $\rho=7$ cm.

18. The display system of claim 5, wherein the distance between the at least two exterior-facing stereo color cameras and both of the user's eyes in the visual plane is $\varphi=9.3$ cm so that the at least two exterior-facing stereo color cameras may run at 30 Hz with 720p resolution and 90° field of view (FOV).

19. The method of claim 14, wherein the depth estimation uses a Recurrent All-Pairs Field Transform (RAFT)-stereo algorithm to calculate a disparity map at each stereo input view, which may then be converted to depth maps using pre-calibration parameters, which may be expressed as follows:

$$d_l=\text{stereo\_depth}(c_l,c_r)$$

$$d_r=\text{flip}(\text{stereo\_depth}(\text{flip}(c_r),\text{flip}(c_l)))$$

where $d_l$ represents an output inverse depth map at a left view,
$d_r$ represents an output inverse depth map at a right view,
$c_l$ represents a rectified left input image,
$c_r$ represents a rectified right input image,
stereo_depth represents a depth estimation algorithm, and
flip represents an operator to horizontally flip an image.

* * * * *